Nov. 5, 1940.    W. S. CLOSE    2,220,708

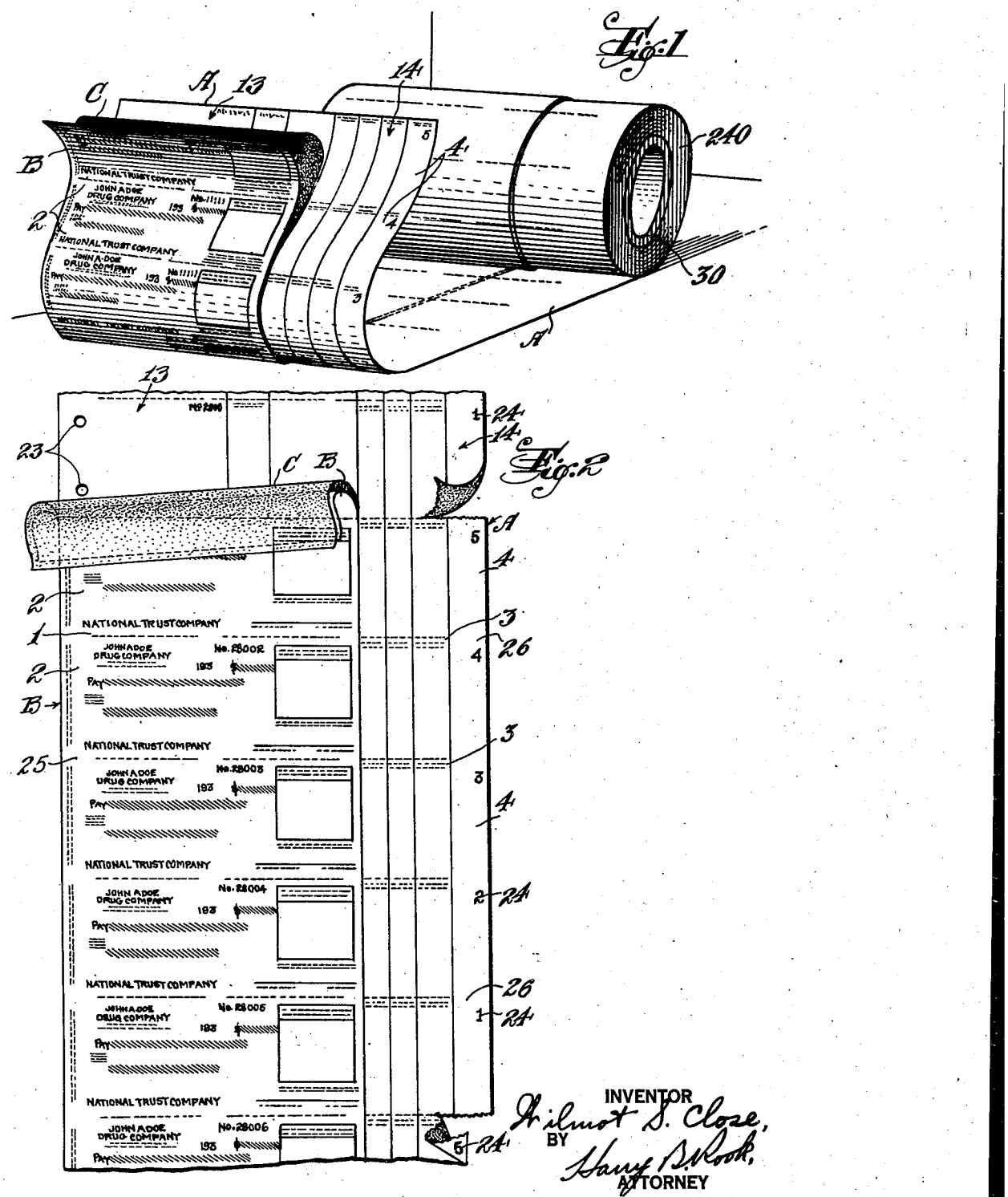

TYPEWRITER SUPPLY ROLL FOR TYPEWRITING CHECK AND CASH BOOK ENTRIES

Filed Jan. 29, 1938    3 Sheets—Sheet 2

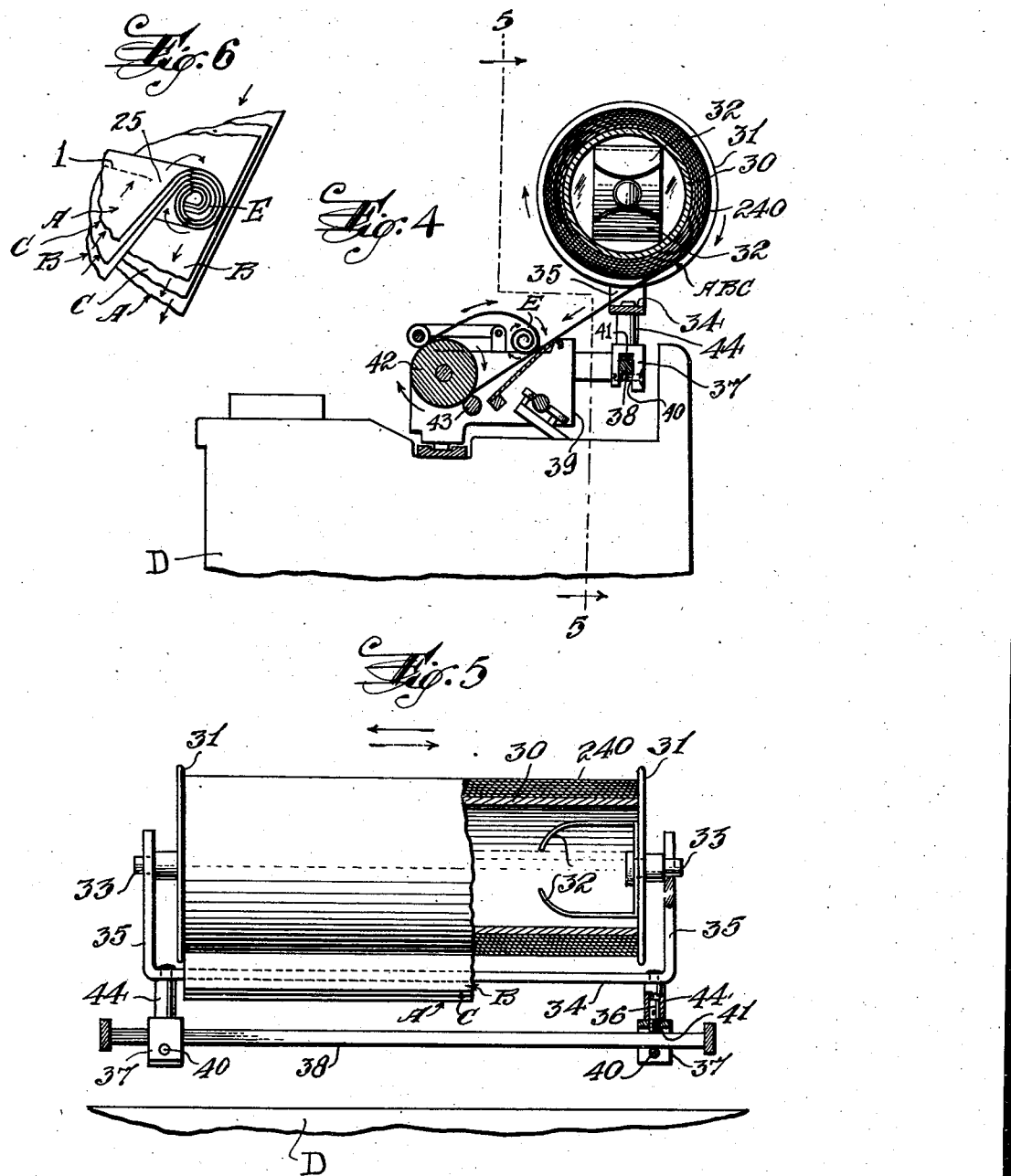

Patented Nov. 5, 1940

2,220,708

UNITED STATES PATENT OFFICE 2,220,708

TYPEWRITER SUPPLY ROLL FOR TYPEWRITING CHECK AND CASH BOOK ENTRIES

Wilmot S. Close, Mountain Lakes, N. J.

Application January 29, 1938, Serial No. 187,578

3 Claims. (Cl. 282—12)

This application is a continuation in part of my application Serial No. 649,910 filed January 3, 1933.

In order that my invention and its advantages may be clearly understood and differentiated from prior check writing and bookkeeping systems, it will be helpful to refer briefly to some of the systems now in use. As is well known, in many systems of accounting or bookkeeping it is customary to utilize a check book comprising a number of checks and attached stubs, the checks being individually filled in and entries being made separately on the corresponding stubs to identify the checks. Thereafter, entries relating to the amount of the check, the corresponding invoice, etc., are made in separate books. Envelopes for the checks are also separately addressed for mailing. In other systems carbon copies of checks are made instead of utilizing separate stubs, which is an improvement over the use of stubs, and in some instances the check blanks are so prepared that the checks can be mailed in "window" envelopes or envelopes having transparencies to expose the name and address of the payees of the checks so as to avoid addressing of envelopes, which is desirable.

Also many checks are written with check writing machines; such machines are expensive, require considerable time for operation, and necessitate writing of the check at a different time and separately from other bookkeeping operations. The main object of these check-writing machines is to prevent alteration of the amount of the check and/or the name of the payee, which is highly desirable.

Instead of check books, continuous strips of check-blanks comprising a plurality of blanks separable from each other along scored or perforated lines, have been used, the strips being initially fan-folded and thereafter unfolded as the check blanks are required for writing, as shown in Patent No. 1,641,620 dated September 6, 1927; this system has great advantages over the check book and stub system.

In all of these systems known to me separate entries are made in cash books or similar records relating to the date, check numbers, amount of checks, names of the payees, the corresponding invoice, discount allowed, etc. Also these systems are cumbersome, consume a large amount of time for operation, require the services of a number of persons and are expensive. Furthermore, the making of entries relating to the same transaction at different times and in different records, addressing of envelopes, etc. results in frequent and sometimes costly mistakes.

Therefore the prime objects of my invention are to provide means for accomplishing all of the above mentioned desirable results of known systems, and overcoming the objections to and many difficulties incident to use of said known systems; and to provide a novel and improved construction and combination of a check blank, a sheet of transfer medium such as carbon paper and a cash book blank whereby a check can be written or filled in on a typewriter, a copy of the check can be made on the cash book blank, and many required book entries relating to the transaction can be made on the same cash book blank with said carbon copy, all in one continuous operation, by one person and without removing the check blank, sheet of transfer medium or the cash book blank from the typewriter, after which the check can be separated from the cash book blank and mailed in a window envelope, and the cash book blank can be filed for example in a loose-leaf binder which may constitute a cash book, whereby a simple, inexpensive check-writing and bookkeeping system is ensured which requires a minimum number of operators, greatly reduces the possibilities of error, and requires for operation only a fraction of the time now required by known systems.

Another object is to provide in such a combination of check-blank and cash book blank, a novel and improved construction and combination of a plurality of check forms or sections and corresponding cash book forms or sections wherein the plurality of check-forms are arranged on a continuous strip and separably connected to each other, and the plurality of cash book forms are similarly arranged in a continuous strip and separably connected together, said strips being arranged in superposed relation with a sheet of transfer medium or carbon paper between them, and wound into a roll, whereby carbon copies of all of the checks can be made on the same cash book strip, and a plurality of said cash book forms can be separated together from said cash book strip in the form of a sheet and bound with other similar sheets in book form, for example in a loose-leaf binder, to form a cash book.

A further object is to provide as an article of manufacture, a typewriter supply roll of the character described for typewriting simultaneously checks and cash book pages wherein said cash book forms or sections are arranged in a plurality of consecutive series each of which comprises a plurality of sections and the cash book blank strip has indicia to distinguish the series from each other, for example each of said series having indicia thereon, for example numbers, to indicate the end of one series and the beginning of the next adjacent series, and wherein each series is separable from the others and constitutes a cash book page.

Other objects are to provide a novel and improved means whereby said supply roll can be mounted on a typewriter, the strips can be progressively unrolled and typewritten and the free end typed portions of the strips can be initially manually rolled and thereafter automatically rolled by and simultaneously with unrolling of the strips from the supply roll, in an out-of-the-way convenient position and with a minimum of attention from the operator; and thus to provide the strips with a novel and improved form of scoring between the various check sections and cash book sections of the respective strips to prevent accidental bending or folding of the strips between said sections so as to facilitate re-rolling of the free ends of the strips as described, and to prevent accidental tearing or separation of the sections along said scoring.

Another object is to provide means on the cash book strip, for example said indicia numbers, whereby to indicate when a check form is missing, for example, when a check form has been removed from the strip without authority. The numbers of each series of numbers may be so arranged that a cash book form bearing a particular number normally should appear on the form at the free extremity of the strip so that the absence of such a form or the presence of such a form in blank without a corresponding checkform, will indicate that a check has been improperly removed from the check-form strip.

Other objects, advantages and results of the invention will be brought out by the following description.

Referring to the accompanying drawings in which corresponding and like parts are designated throughout the several views by the same reference characters Figure 1 is a perspective view of a typewriter supply roll consisting of the check blank strip, cash book blank strip and a strip of transfer medium in assembled relation ready for use.

Figure 2 is an enlarged fragmentary plan view of the three strips, portions of the check blank strip and transfer strip being turned back for clearness in illustration and some of the sections of the cash book blank strip being partially severed from the strip.

Figure 3 is a further enlarged fragmentary plan view of the check blank and cash book blank strips showing the details thereof.

Figure 4 is a transverse sectional schematic illustration showing the manner of mounting the typewriter supply roll on the carriage of the typewriter and re-rolling the free ends of the strips after typing thereof.

Figure 5 is a longitudinal sectional view on the line 5—5 of Figure 4, and

Figure 6 is a fragmentary perspective view showing in detail the manner of re-rolling the free ends of the strips.

Specifically describing the illustrated embodiment of the invention, the reference character A designates the cash book blank strip, B the check blank strip and C the strip of transfer medium.

The check blank strip is divided by transverse scored lines 1 into a plurality of check forms or sections 2, while the cash book blank strip A is similarly divided by a plurality of transverse scored lines 3 into a plurality of cash book forms or sections 4, one for each of the check sections 2. The two strips A and B are arranged in superposed relation with the strip C of transfer medium between them so that each check section accurately overlies and corresponds to one of the cash book sections. The transfer medium C is so arranged that the carbon copy of inscriptions made as by a typewriter or printing machine, on any check section, may be produced on the corresponding cash book section.

Each check section is preferably of the usual form and size of a check, but the size is immaterial to the invention; and preferably each check section has certain inscriptions printed thereon, for example the name of the maker of the check, as indicated at 5, and the name of the bank upon which the check is drawn as indicated at 6. Also, preferably each check section has a space 7 to receive inscriptions identifying invoices of which the check is a payment, or any other suitable data. The check sections may be separated from each other along the scored lines 1.

In accordance with the invention, it is intended that certain inscriptions on the check, for example, the amount of the check, the name and address of the payee, shall be written by a typewriter or printing machine so as to produce a clear carbon copy of such inscriptions on the corresponding cash book section 4. As shown on the drawings, each check section has a space 8 to receive an inscription representing the amount of the check, a space 9 to receive the name of the payee, and under the space 9 another space 10 to receive the address of the payee. An additional space 11 may be provided to receive an inscription in figures representing the amount of the check.

As above stated, when the inscriptions are typed or printed upon a check, a copy of said inscription is simultaneously made upon the corresponding cash book section 4 of the strip A through the transfer medium C which may be carbon paper of known type. To receive the carbon copy of the check, each cash book section 4 is provided at one end with a space 13, and the other end of the cash book section extends beyond the corresponding end of the check as at 14 to provide spaces for receiving cash book data relating to the transaction of which the corresponding check is a part. As shown in the drawings, the extension 14 of the cash book section is divided vertically into four columns 15, 16, 17 and 18, and each column in each cash book section has a title at the top thereof indicating the character of the data to be inscribed in the corresponding column. In the drawings, the column 15 is intended to receive the number or numbers of the invoices of which the corresponding check is a payment, and said column has an appropriate inscription 19. The column 16 is to receive an inscription representing the cash discount allowed on the amount of the invoices, said column having an appropriate inscription 20. The column 17 is intended to receive an inscription representing the gross amount of this invoice and has an appropriate inscription 21, while the column 18 is intended to receive miscellaneous data and carries a suitable inscription 22.

Another feature of the invention is the arrangement of the cash book sections 4 into a plurality of series, each series constituting a plurality of sections which may be bound with other similar series into book form so that each series of sections constitutes a page of the book. For example, the series of sections may be bound in a loose-leaf binder and accordingly provided with perforations 23 to receive the posts of such a binder. Also, said cash book blank has indicia to indicate the sections comprised in each series and thereby facilitate the distinguishing and separation of the plurality of series from each other, for example to indicate the end of one series and the beginning of the next successive series. As shown in the drawings, each series of sections comprises five sections and the sections bear consecutive numbers 24 on the extension 14 of the cash book blank strip exposed beyond the check blank strip and the transfer strip. Each series is correspondingly numbered, that is, each section of each series has the same number or indicia as the corresponding section of the other series. Therefore, in the specific instance illustrated, the operator may know that by separating the sections on the scored lines occuring between the sections numbered 1 and 5, the cash book blank strip A may be divided into a plurality of series of sections, each series of the same size to constitute a page in a book.

This indicia has another advantage in indicating when a check is improperly missing from the check blank strip B. It will be noted that a cash book section 4 bearing the number 5 should properly appear at the extreme end of said strip and should such a section be missing or be present in blank without a corresponding check section, the improper removal of a check section from the check blank strip B will be indicated. Accordingly, the possibility of unauthorized use of checks from the check blank strip will be greatly reduced, and the unauthorized or improper removal of a check from the strip will be quickly indicated to an observer of the strip.

In accordance with my invention, the strips A, B and C are rolled together to form a typewriter supply roll, as indicated at 240, so that the free ends of the strip may be inserted into a typewriter or printing machine and the strips can be withdrawn from the roll as required for use.

For the purpose of illustrating this use of the roll, the roll 240 is shown with a tubular core 30 on which the strips are wound. An end plate 31 is removably attached to each end of the core to form a flange for the core. As shown each end plate has a spring element comprising a pair of spring arms 32 at one side secured centrally thereon to removably frictionally fit into the end of the core, and each plate has at its side opposite the spring element, a trunnion 33 for revolubly mounting the roll on a support. With this construction, the end plates easily and quickly can be withdrawn from a consumed roll and inserted into a new roll.

The support for the roll comprises a bracket including a U-shaped section 34 the arms 35 of which have notches to separately receive the trunnions 33. The base of the section 34 has a pair of tubular legs 44 each to separably frictionally fit over a post 36 that has a bifurcated foot 37 to straddle the tabulator bar 38 of the carriage 39 of a known typewriter D. A screw 40 passes through the bifurcation of the foot 37 beneath the bar 38, and the post 36 is screw-threaded at 41 through the foot to abut said bar 38 and tightly clamp the foot on the bar.

In use of the invention, the bracket is secured on the typewriter carriage and the roll 240 is mounted on the bracket with its axis parallel to the axis of the platen 42 of the typewriter, as shown in Figures 6 and 7. Then the free end of the strips A, B and C are slipped between the platen and the presser rollers 43 in the usual manner, and the strips are unrolled from the roll 240 by rotation of the platen as is usual in feeding paper in a typewriter.

In filling out a check, the operator of the typewriter is required merely to type the amount of the check in words and figures, and the name and address of the payee of the check. In an operation continous with the check writing operations, the cash book data may be typewritten in the columns 15, 16, 17 and 18.

To facilitate this operation, I have provided a novel and improved form of the scored lines 1 and 3 of the strips to permit rolling of the free ends of the strips simultaneously with unrolling of the strips from the roll 240. As shown the scored lines 1 and 3 terminate short of the edges of the strips as indicated at 25 and 26 and also these scored lines are interrupted intermediate their ends at 27. As the free ends of the strips are typed, they are first manually rolled and then laid upon the strips between the platen and the roll 240 as shown at E in Figures 6 and 8. Thereafter, continued unrolling of the strips from the roll 240 will result in continued rolling of the free ends of the strips at E, the portions of the strips between the roll 240 and the platen serving in effect as a friction drive for rolling the free ends.

This operation is permitted by the form of the scored lines 1 and 3 which prevent accidental bending or folding of the strip along said lines during the re-rolling of the strips and also prevent unintended tearing apart of the strips under the tension incident to unrolling of the strips from the roll 240 or during subsequent handling of the strips.

At any desired time after the typing of the strips has been completed, the checks may be separated from the strip B along the scored lines 1, and each series of cash book sections may be separated from the strip A as the series is completed, whereupon the series of cash book sections may be filed, for example in a loose-leaf binder. To separate the sections, the strips may be creased at the points 25, 26 and 27 prior to tearing the strips along the scored lines.

It will therefore be observed that checks may be written and cash book entries relating to the transaction of which the check is a part, may be made in continuous operations and by the same person, so that separate inscribing of cash book data into a cash book after the check has been written, as well as the necessity for filling out check stubs, is obviated. A carbon copy of the check, including the name and address of the payee is always available in the cash book for subsequent reference. The check bearing the name and the address of the payee may be inserted into a "window" envelope for mailing so that the necessity for addressing envelopes for mailing of the checks is eliminated. The possibility of error in inscribing data into a cash book is greatly reduced and the whole procedure of writing checks and making cash book entries, is greatly expedited. Checks may be written and cash book entries made in continuous operations with my invention in less time, with fewer operations, with less duplication of work and at much less expense than is possible with known methods and means.

While it is probably unnecessary to mention it, it will be understood that the check sections and cash book sections will be correspondingly numbered as indicated at 28, and any other suitable data which the user may desire, may be added to either the check sections or the cash book sections. It will also be obvious that with the protection afforded by the checks against alteration, and the arrangement of the strips in a roll which reduces the possibility of unauthorized removal of checks from the check blank strip, it is possible to easily obtain protection from bonding companies against unauthorized alteration or use of the checks, and at low premium rates. It will be observed that only the checks at the free end of the roll are accessible for use, and removal thereof can be quickly detected; the checks at the other end of the strip are not accessible, being within the roll, so that unauthorized removal and forgery of a check, as is possible at the back of a check book or at either end of a fan-folded strip, is absolutely prevented.

While I have shown and described the check blank strip and cash book blank strip of certain forms and construction, it should be understood that this is primarily for illustrating the principles of the invention, and that many modifications and changes may be made in the strips and their arrangement, without departing from the spirit or scope of the invention.

Having thus described my invention, what I claim is:

1. The combination of a plurality of strip blanks to receive inscription arranged in superposed relation with transfer medium between them, at least one strip to receive a copy of matter on the other strip through said transfer medium, said strips having transverse scored lines to form a plurality of sections separable from each other transversely of the blanks, said transfer medium being a continuous strip extending over the first-mentioned strip, said strips and said transfer medium being formed into a common roll whereby all of said strips can be simultaneously and progressively unrolled and are held in accurate register with each other, said scored lines terminating short of the edges of the respective strips and being interrupted intermediate their ends to prevent unintended tearing or folding or bending of said strips along said scored lines during handling of the strips and to facilitate rolling of the free ends of the strips as said roll is unwound.

2. As a new article of manufacture, a typewriter supply roll for typewriting simultaneously checks and cash book pages and composed of rolled superposed continuous cash book blank and check blank strips with a transfer strip therebetween, adapted to be continuously and simultaneously unrolled and passed through a typewriter for typing a check upon said check blank strip and recording a copy thereof on said cash book blank strip through said transfer strip, said check blank strip comprising a plurality of check sections separable from each other, and said cash book blank strip comprising a plurality of consecutive series of cash book sections, each series having the same number of sections and there being one cash book section for each check section, said cash book blank strip having an extension beyond said check blank strip at one longitudinal edge providing throughout its length a zone of a width to have typed thereon in one operation continuous with the typing of a check, cash book data relating to the transaction of which the coresponding check is a part, said extension of said cash book strip having indicia thereon adjacent the junctures of each two adjacent series of sections and constantly exposed beyond said check blank strip and said transfer strip to indicate the end of one series of sections and the beginning of the next adjacent series of sections, said cash book blank strip being formed for severance between adjacent series of sections so that said plurality of series may be separated successively from said cash book blank strip, and each series having one edge portion formed to interlock with the sheet holding means of a loose leaf binder when said series are separated from the cash book blank strip, whereby each series constitutes a page of a cash book.

3. As a new article of manufacture, a typewriter supply roll for typewriting simultaneously checks and cash book pages and composed of rolled superposed continuous cash book blank and check blank strips with a transfer strip therebetween, adapted to be continuously and simultaneously unrolled and passed through a typewriter for typing a check upon said check blank strip and recording a copy thereof on said cash book blank strip through said transfer strip, said check blank strip comprising a plurality of check sections separable from each other and progressively numbered beginning at the free end of the strip, and said cash book blank strip comprising a plurality of consecutive series of cash book sections, each of which comprises the same number of sections, there being one of said cash book sections for and numbered correspondingly to each check section, said cash book blank strip having an extension beyond said check blank strip at one longitudinal edge providing throughout its length a zone of a width to have typed thereon in one operation continuous with the typing of a check, cash book data relating to the transaction of which the corresponding check is a part, the sections of each series of said book sections having different indicia thereon and the indicia of each section of one series being identical with the indicia of the corresponding sections of the other series, and said cash book blank strip being scored between adjacent series of sections so that said plurality of series of cash book blank sections are separable from each other, and each series having one edge portion formed to interlock with the sheet holding means of a loose leaf binder when said series are separated from the cash book blank strip, whereby each series constitutes a page of a cash book.

WILMOT S. CLOSE.